(12) United States Patent
Wigdorski et al.

(10) Patent No.: US 9,512,340 B2
(45) Date of Patent: Dec. 6, 2016

(54) REACTIVE FILM ADHESIVE

(71) Applicant: ADHESIVES RESEARCH, INC., Glen Rock, PA (US)

(72) Inventors: Robert M. Wigdorski, Red Lion, PA (US); Donald Herr, Lancaster, PA (US)

(73) Assignee: Adhesives Research, Inc., Glen Rock, PA (US)

( * ) Notice: Subject to any disclaimer, the term of this patent is extended or adjusted under 35 U.S.C. 154(b) by 25 days.

(21) Appl. No.: 14/102,566

(22) Filed: Dec. 11, 2013

(65) Prior Publication Data

US 2014/0158296 A1  Jun. 12, 2014

Related U.S. Application Data

(60) Provisional application No. 61/735,593, filed on Dec. 11, 2012.

(51) Int. Cl.
| | | |
|---|---|---|
| *C09J 167/00* | (2006.01) | |
| *C09J 7/02* | (2006.01) | |
| *C08J 5/18* | (2006.01) | |
| *C09J 163/00* | (2006.01) | |
| *C08G 59/68* | (2006.01) | |

(52) U.S. Cl.
CPC ............ *C09J 167/00* (2013.01); *C08G 59/687* (2013.01); *C08J 5/18* (2013.01); *C09J 7/02* (2013.01); *C09J 163/00* (2013.01)

(58) Field of Classification Search
CPC ....... C09J 133/00; C09J 133/08; C09J 167/00; C09J 167/02; C09J 163/00; C09J 155/00; C09J 155/02
See application file for complete search history.

(56) References Cited

U.S. PATENT DOCUMENTS

| | | | |
|---|---|---|---|
| 4,882,245 A | 11/1989 | Gelorme et al. | |
| 6,001,428 A * | 12/1999 | Finter | C08G 59/68 427/485 |
| 6,057,382 A * | 5/2000 | Karim | C08L 63/00 522/100 |
| 6,254,954 B1 * | 7/2001 | Bennett | C09J 7/00 156/275.7 |
| 7,378,455 B2 * | 5/2008 | Lu | C08G 59/68 264/272.11 |
| 2005/0092428 A1 | 5/2005 | Crivello | |

FOREIGN PATENT DOCUMENTS

| | | |
|---|---|---|
| EP | 1026218 A1 | 8/2000 |
| WO | 99/57216 A1 | 11/1999 |
| WO | 2006029095 A1 | 3/2006 |

* cited by examiner

*Primary Examiner* — Sanza McClendon
(74) *Attorney, Agent, or Firm* — McNees Wallace & Nurick LLC

(57) ABSTRACT

An actinic radiation activated, thermally curable solid film adhesive is disclosed that includes a film forming polymeric binder, a cationically curable resin, and a cationic photoinitiator. The solid film adhesive is capable of being processed at temperatures up to 120° C. prior to exposure to actinic radiation without curing, has a latency period at room temperature following activation of the initiator, and is curable at temperatures above 50° C. following activation of the initiator.

7 Claims, 3 Drawing Sheets

REACTIVE FILM ADHESIVE

CROSS-REFERENCE TO RELATED APPLICATIONS

This application claims the benefit of and priority to U.S. Provisional Application No. 61/735,593, filed Dec. 11, 2012, which is hereby incorporated by reference in its entirety.

FIELD

The present disclosure is directed to reactive film adhesives and more particularly to reactive film adhesives having a period of latency following activation.

BACKGROUND

Thermally curable adhesives typically present a trade-off between cure temperature and/or cure speed versus shelf-life. Generally, the more chemically active a thermally curable adhesive, the shorter its shelf-life at ambient temperatures.

Numerous attempts have been made to try to overcome this problem and achieve a balance of these two characteristics, although none have yet proved to be satisfactory. One approach to improving the shelf-life stability of a thermally curable adhesive is triggered reactivity. In this approach, a chemical or physical change occurs to the adhesive upon the application of some activation step, or "trigger." Examples of such triggers for one-part systems include exposure to moisture (e.g. moisture cure one-part polyurethanes or silicones), thermal deblocking of a reactive species or curing agent (e.g. blocked isocyanate curing agents for polyols or salted/adducted amine curing agents for epoxies), exposure to radio frequency radiation, internal heating of an adhesive containing ferromagnetic particles upon exposure to a fluctuating magnetic field (induction cure), or ultra-violet (UV) or visible radiation to photochemically initiate a reaction (radiation curing).

One feature of radiation curable materials is that the cure is localized to the areas exposed to radiation (i.e. the UV or other light source). For applications in which two opaque substrates are to be bonded together, a traditional radiation cure is often not an option as light cannot reach the adhesive bond line through those opaque substrates.

Cationic UV curing has been employed in some cases for radiation curing between two opaque substrates. Cationic UV systems typically function via photochemically induced formation of a strong acid from a cationic initiator such as a diaryliodonium or a triaryl sulfonium salt.

With common cationic UV curable systems, these photoinitiators are combined with highly reactive epoxies, vinyl ethers, or oxetanes. The strong acid produced by the photoinitiator upon light exposure induces a rapid cationic cure of these acid-reactive monomers and oligomers to form a polymerized/crosslinked resin matrix. Typical liquid cycloaliphatic epoxies, vinyl ethers, and oxetanes cure with kinetics similar to radically curable systems, in that there is little or no open time or latency between UV irradiation and extensive resin cure. However, components or additives which essentially reduce the activity of the photoacid catalyst or the cationic propagating species can slow or retard cationic cure because the propagating cation is not quenched by typical ambient conditions that would terminate the active species in a radical polymerization. Several approaches are known to retard the cure of UV curable cationic systems, but all have attendant drawbacks.

In some cases, a photoinitiator is used with a nucleophilic anion. However, while increasing the nucleophilicity of the counteranion slows down the kinetics of the cure generally, it does not provide a noticeable change in latency or discrete open time between activation and cure. As such, this approach has limited commercial utility.

Another approach to delayed cationic cure is the use of mildly basic additives, such as aliphatic or aromatic amines. However, this approach is also unsatisfactory because the basic additive remains present in the final cured network, resulting in possible migration or extraction during end use, as well as increased sensitivity to ambient impurities and reduced cure rates upon heating.

Still another way to delay or retard a cationic cure is to use a less reactive polymerizable resin. The simple use of low reactivity liquid monomers is of limited utility unless only very brief open times are required. There is not a true latency period in which propagation is slowed or stopped, but some open time can be attained due to the overall slow cure kinetics of the liquid adhesive. In this situation there is not a cure "trigger" which suddenly accelerates the system reactivity/cure kinetics. The inherent liquid adhesive reactivity is simply low.

An extension of systems with slow cationic cure kinetics is so-called "frontal polymerization," in which the activation energy for ring-opening polymerization exceeds ambient thermal energy and the curing process does not proceed until a point source of heat is applied, at which point thermal autoacceleration occurs due to the exotherm of polymerization. However, unless heat is actively removed from the liquid system after autoacceleration begins, it cannot be slowed or stopped, so there is not an open time between triggering/activating the system and the onset of rapid curing.

Furthermore, frontal polymerization and slow monomer delayed UV cationic cure concepts rely completely on specific structural motifs present in the particular epoxy monomers used. As such, these techniques are useful for a limited subset of monomer structures, all of which are liquids.

Two part initiator systems have been combined with slow cure kinetics and frontal polymerization concepts, but such systems still require mixing at the point of use. That mixing often presents significant practical manufacturing limitations, with latency on the order of a few seconds to an hour.

These and other drawbacks are associated with conventional thermally curable adhesives.

SUMMARY

Exemplary embodiments described herein are directed to providing a one-part solid state film adhesive that exhibits adequate ambient condition shelf-life in the coated state and that can be UV activated prior to bonding to one or more substrates, thus overcoming current drawbacks.

In one embodiment, an actinic radiation activated, thermally curable solid film adhesive comprises a film forming polymeric binder, a cationically curable resin, and a cationic photoinitiator. The solid film adhesive is processable at temperatures up to 120° C. prior to exposure to actinic radiation without curing, has a latency period at room temperature following activation of the initiator, and is curable at temperatures above 50° C. following activation of the initiator.

In another embodiment, a method of forming a solid film adhesive tape comprises mixing a film forming polymeric binder, a solid cationically curable resin, and a cationic photoinitiator to form a solid film adhesive, thereafter laminating the solid film adhesive to a first substrate at a temperature less than 120° C. without curing the solid film adhesive, thereafter activating the photoinitiator, and thereafter curing the solid film adhesive at a temperature greater than 50° C.

Advantages of exemplary embodiments include one or more of: an ability to provide a roll-stable coated film adhesive that exhibits an ambient shelf-life of over 3 months in the dark; a thermally stable initiating system that can be processed (e.g. coated, dried, and/or heat laminated to one substrate or between two substrates) without inducing thermal cure at temperatures below 120° C.; rapid activation with standard initiation sources; minimal cure during and just after activation to exhibit a period of extended latency (i.e. long delayed cure/open time) such that the adhesive can still be processed (e.g. bonded to one or more substrates) minutes or several or more hours after activation; and post-activation reactivity that facilitates extensive curing to a thermoset adhesive during a subsequent curing cycle at temperatures above 50° C.

An additional advantage is that in some embodiments, the final thermal curing may be carried out as a discrete step after post-activation processing or may be accomplished in conjunction with that processing, such as heat lamination of the film adhesive during bonding to the substrate.

DETAILED DESCRIPTION OF EXEMPLARY EMBODIMENTS

Figure 1:
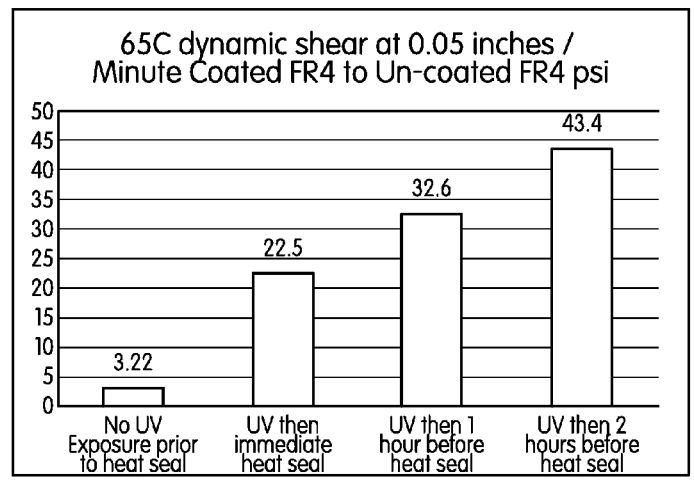
FIG. 1 illustrates dynamic shear measurements obtained in Example 2.

Film adhesives in accordance with exemplary embodiments accomplish one or more of the advantages described herein and contain a polymeric binder of a film forming polymer, a cationically curable resin and a cationic catalyst, typically a cationic photoinitiator that can be activated by UV or other actinic irradiation but which does not dissociate to an appreciable amount by exposure to heat. The film adhesive is a solid at ambient temperatures and the reactive groups of the curable resins have limited mobility in the solid state. It will be appreciated that references to solid film adhesive refers to the state of the film adhesive at ambient conditions, as the adhesive can be softened at elevated temperatures to accomplish the processing steps described herein, although it returns to its solid state upon a return to ambient conditions.

Exemplary embodiments use actinic radiation as a trigger to activate the film adhesive, which is bonded to one or more substrates. In the unactivated state, the adhesive can be coated, stored, heat processed, heat laminated, etc. without curing. In the activated state, the adhesive will cure rapidly upon application of heat. In particular, it can cure rapidly at low temperatures in the range of 50-120° C.

The use of a triggered cure avoids problems seen in conventional systems in which cure reaction activation energy limits the ability to simultaneously achieve both rapid low temperature curing and good ambient shelf life. The catalyst or initiator for triggered curing is chemically masked in the unactivated adhesive and, as such, long ambient shelf life/work life is possible because no active initiator or catalyst is present. Closer to the time of use, the catalyst or initiator is activated, creating a system that cures rapidly and at low temperatures. Such a "triggered cure" system exhibits some open time between activation and bonding, unlike a "cure-in-place" adhesive which cures rapidly once the trigger impulse is applied (e.g. typical UV curable adhesives or induction cured adhesives). Specifically, a triggered or activated adhesive allows one to activate the adhesive in one step and then bond the adhesive to one or more substrates in a second separate step if desired. A traditional curable/cure-in-place adhesive must be bonded to the desired substrates prior to activation or curing and will not wet-out and bond to substrates in a second step after it has been activated.

In embodiments in which the cationic catalyst is a UV activated photoinitiator, UV radiation decomposes the initiator, releasing a strong acid catalyst for curing the reactive components of the film adhesive. However, because the mobility of the reactive groups is limited while the film remains in a solid state, the level of immediate cationic cure is highly limited, providing a long "open time" or "latency." As used herein, the terms "open time" and "latency" are both defined to interchangeably mean the useful worklife between activation and final bonding of the film adhesive.

After heat is applied to soften the activated solid film adhesive, the epoxy or other curable resins more easily flow within the adhesive, resulting in an extensive cure as the reactive groups move into contact with the activated catalyst. The cure may advantageously occur during a heat lamination step in which the film adhesive is finally applied to one or more substrates.

Prior to the irradiation that activates the cationic photoinitiator, the film adhesive can be processed and handled at temperatures up to 120° C.; while the reactive groups are free to move, the presence of the still un-triggered photoinitiator results in no appreciable reaction. As a result, the film adhesive is shelf stable for long periods (up to three months or more). It can also be heat laminated to a first (or several) substrates during an initial processing step and then cooled to ambient conditions. After exposure to UV radiation that triggers the photoinitiator, the film adhesive can then undergo further processing to attach it to a second substrate prior to or contemporaneously with exposure to the heat that results in the final cure.

The radiation triggerable film adhesive in accordance with exemplary embodiments is a solid at ambient conditions in order to limit reactive group mobility. Limiting the reactive group mobility in this manner provides the ability to incorporate a long open time in the adhesive after the UV irradiation that activates the cationic curing catalyst. Open times may range from a few minutes, such as 2, 5 or 10 minutes, to several days at ambient temperatures, more typically in the range of tens of minutes up to several hours. Preferably, film adhesives in accordance with exemplary embodiments have an open time of at least one hour.

As the film is heated following activation of the photoinitiator to form the catalyst and as the film softens, the reactive groups gain enough mobility to come into contact with the photocatalyst and other propagating cationic species and react.

It will be appreciated that a solid state film adhesive can be obtained in accordance with various methods known to those skilled in the art. In accordance with exemplary embodiments, a preferred method to obtain a reactive solid film adhesive is to blend a film forming polymer with a solid cationically curable resin, preferably a solid epoxy resin.

However, the curable resin may be a liquid depending on the ratio of the solid film forming polymer to the resin. High curable resin levels relative to the film forming polymer are preferred and thus the use of a solid resin is also preferred.

The epoxy (or other curable) resin and the film forming polymer can be blended by any means known to those skilled in the art, such as melt blending or dissolution in an appropriate solvent, by way of example. Solvent-borne systems can be coated and dried to yield the film adhesive product; melt blends can be extruded or hot melt coated. It will be appreciated that such methods are exemplary only and the method of blending and forming the film adhesive is not limited.

Typical film forming polymers include polyesters, polyurethanes, polyimides, siloxane polyimides, polyamides, rubbers such as styrene-butadiene rubber (SBR), nitrile rubber (NBR), carboxy-terminal nitrile rubber (CTBN), ethylene-propylene-diene monomer copolymer (EPDM), polybutadiene rubber, polyisoprene rubber, poly(styrene-butadiene-styrene) block copolymer (SBS), poly(styrene-isoprene-styrene) block copolymer (SIS), styrene-b-ethylene-co-butylene-b styrene block copolymer (SEBS), styrene-b-ethylene-co-propylene-b-styrene block copolymer (SEPS), ethylene co-vinyl acetate, as well as acrylic polymers, all by way of example.

The film forming polymer may contain functionality that is reactive with the epoxy resin. Alternatively, the film forming polymer may be non-reactive. A preferred class of film forming polymers are polyester resins, such as those known under the trade names Dynacoll (available from Evonik) and Vitel (available from Bostik). However, it will be appreciated that the identity, characteristics, functionality, if any, and other specific properties of the film forming polymer may vary based on the particular processing conditions (before and after activation) as well as the adhesive's end use, and that the selection of the appropriate film forming polymer in any particular case is within the ability of one of ordinary skill in the art.

The cationically curable resin can be any of those known to those skilled in the art. Examples include epoxies, oxetanes, vinyl ethers, vinyl amides, and lactones. Solid resins are preferred. While curable liquid resins can be employed, the use of liquids, particularly in significant amounts, increases mobility within the solid state film adhesive, reducing the latency time.

In preferred embodiments, the cationically curable resins are epoxies and more preferably are solid epoxy resins. Suitable solid epoxy resins include glycidyl ethers, including those known as the Epon series of resins available from Momentive Performance Materials, including Epon 1031, Epon 164, SU-8, and Epon 1001, although other suitable solid epoxy resins are commercially available, including those provided by CVC Thermoset Specialties. Cycloaliphatic epoxies, such as ERL 4221 available from Dow Chemical, may also be used, although commercially available cycloaliphatic resins are liquids and thus, if used, should be used at less than about 30% by weight of the film forming polymer, typically in combination with a solid epoxy or other curable resin.

Representative oxetane resins include those commercially available as OXT-221 and OXT-121 from Toagosei. Representative vinyl ether resins include triethylene glycol divinyl ether (TEGDVE), cyclohexanedimethylol divinyl ether (CHVE), and dodecyl vinyl ether (DDVE), including those commercially available from BASF.

The amount of the cationically curable resin may vary depending on the application, but generally ranges from about 10% by weight to about 75% by weight of the total solids of the film adhesive (i.e., excluding any solvent) and in some cases in the range of about 10% to about 55% by weight solids of the film adhesive, and in still other cases in the range of about 35% to about 50% by weight solids of the film adhesive. The film forming polymer content is generally about 25% by weight to about 90% by weight, typically in the range of about 40% to about 60%.

The cationic photoinitiator incorporated into the solid film adhesive may be primarily selected based on its UV absorbance profile and thermal stability with respect to end-use and processing requirements which, like the film-forming polymer, may vary depending on the particular application for which the adhesive is being employed. The principles and criteria to be used for the proper selection of photoinitiator are understood to those skilled in the art of UV curing.

In accordance with exemplary embodiments, particularly suitable cationic photoinitiators include sulfonium salts, such as triarylsulfonium salts, and iodonium salts, such as diaryl iodonium salts. For melt processing and solvent coating involving high temperature solvent removal, the higher thermal stability of triarylsulfonium salts is preferred. If long wavelength UV absorption is desired, diaryl iodonium salts are often preferred as they are easier to photosensitize via direct or redox sensitization relative to sulfonium salts. Preferred photoinitiators include Chivacure 1176 available from Chitech and PC2506 available from Polyset, Inc. The photoinitiator is present in an amount of about 0.1% to about 10% by weight of total solids, typically in the range of about 0.5% to about 5% by weight of total solids.

Light activation of the film adhesive can be effected by the use of any suitable light sources known to those skilled in the art; visible or UV wavelengths can be used, depending primarily on the absorption profile of the photoinitiator and the adhesive resins employed. Other sources of actinic radiation such as microwave and IR may also be used. Common light sources include Hg arc lamps, microwave UV/vis sources, and light emitting diode (LED) light sources. Although primarily discussed herein in terms of actinic radiation triggered initiation to decompose the photoinitiator and produce a cationic catalyst, the photoinitiator can also be decomposed by other methods known in the art such as sonication and electron beam exposure, by way of example.

It will be appreciated that other suitable additives used in combination with conventional film adhesives may also be employed in combination with exemplary embodiments. The additives may be reactive or non-reactive and can be used to modify mechanical properties, adhesion, melt temperature, melt flow rate, coatability, cure rate, cure conversion, and other physical properties of the uncured and cured film adhesive.

Other additives include polymers that modify adhesion and/or modulus of the cured material via the crosslink density of the cured adhesive. For example, flexible poloyls such as polyethylene glycol or dimer diol can be added to impart flexibility to the cured adhesive. Alternatively or in combination, the curable resin may include a flexible liquid or solid epoxy to modify adhesion and modulus of the cured adhesive. A preferred liquid flexible epoxy resin is dipropylene glycol diglycidyl ether, such as that available from Dow Chemical as DER 736.

Still other additives such as organic or inorganic fillers, adhesion promoters, leveling agents, and photosensitizers may also be employed.

Solid film adhesives in accordance with exemplary embodiments can thus undergo multiple thermal processing steps, including thermal processing before and after the triggering event (e.g. exposure to radiation, etc., depending on the particular catalyst employed). By thermal processing is meant any process that involves the addition of heat to temperatures in excess of about 50° C. Examples of thermal processing include melt coating, solvent coating followed by heated solvent removal, heated roll lamination, heated vacuum lamination, and heated bonding to one or more substrates.

As already described, before activation the film adhesives in accordance with exemplary embodiments do not exhibit extensive curing during such thermal processing steps, because the cationic initiators employed are those that do not thermally dissociate below about 200° C. As a result, the films can be solvent coated and dried, for example, without premature curing and can thereafter be heat laminated to one or more substrates without curing. As such, the films wet out and bond to those substrates effectively because the film adhesive is still an uncured thermoplastic material. One thermal processing step includes heated roll lamination of the uncured film adhesive on a release liner to a first substrate.

After initial thermal processing and a return to ambient conditions, and thus to a solid state, the films are exposed to UV radiation or other trigger event that activates the photoinitiator, which decomposes to form a strong acid catalyst. The films exhibit a period of extended latency because of their solid state in which the reactive functional groups of the epoxy or other cationically curable resin are not mobile enough to move and encounter one another to induce a chemical reaction/crosslinking During this open time, the material can be handled or stored while still remaining essentially a thermoplastic film adhesive. Because it remains uncured, the film can subsequently be processed at temperatures below about 50° C.

Once the film adhesive has been assembled into the desired laminated structure, it can be thermally cured to a thermoset material. Typical cure temperatures range from about 50° C. up to about 200° C., depending on substrate requirements and desired cure time. A typical cure profile for many applications is 100 to 120° C. for one to ten minutes, although relatively low temperature cure profiles such as 90 to 100° C. for as short as one minute are also viable. It will be appreciated that the minimum cure temperature is determined primarily by the temperature at which the activated film adhesive softens and the reactive functional groups become chemically mobile and able to rapidly react, and thus may depend upon the particular application for which the adhesive is intended to be used and specific film forming materials selected.

Alternatively, in some cases the subsequent processing includes exposure to heat that also cures the adhesive. For example, a heated vacuum lamination process after UV activation may serve as both the bonding process for the uncured film adhesive and the subsequent thermal cure process. The activated, but uncured thermoplastic film can flow and wet-out on the desired substrate, while the exposure to heat during the lamination allows the curable resin to flow within the adhesive in the presence of the now-activated initiator.

In an exemplary production process, a solid film adhesive in accordance with exemplary embodiments coated on a release liner is heat roll laminated to a first substrate (i.e., a first surface of the film is adhered to the first substrate while an opposing second surface of the film remains covered by the release liner on which the film was originally coated). Even after initial thermal processing, upon return to the solid state and prior to initiator activation, the solid film adhesive has a shelf life of at least 24 hours, typically at least seven days, and more typically at least three months without curing. When ready for use, the film adhesive is then exposed to UV or other source that activates the photoinitiator to form the catalyst, which along with the curable resin remains essentially immobile within the solid film adhesive. The UV exposure may take place either before or after removal of the release liner.

Thereafter, the film may be handled or stored for a period of time, typically measured in tens of minutes to several hours, followed by heated lamination of a second substrate to the still essentially uncured film adhesive. This results in attaching the second substrate to the first substrate, which was previously applied to the opposing side of the film. It will be appreciated however, that the film adhesive may also be activated prior to laminating to either substrate, which may depend on the particular substrates to be attached and other manufacturing considerations.

Depending on the amount of heat and time for the lamination to apply the second substrate, if the cure is not completed by end of the processing, the now three layer laminated product can be further cured, the final product in either case resulting in a crosslinked thermoset bond between the first and second substrates.

EXAMPLES

The invention is further described by way of the following examples, which are presented by way of illustration, not of limitation.

Example 1

To a conventional film forming polyester resin (Bostik KP7962) was added solid epoxy resin (SU-8 from Momentive Performance Material), along with a UV activated sulfonium salt photoinitiator (Chivacure 1176 from Chitech) using methyl ethyl ketone (MEK) as solvent in the amounts shown below in Table 1, which reflects both the total weight and the solids contribution (excluding solvent weight).

TABLE 1

|  | Solids contribution (g) | Total Weight (g) |
| --- | --- | --- |
| Polyester resin | 16 | 50.15 |
| Curable resin (50% Epon SU-8 in MEK) | 11 | 22.0 |
| Photoinitiator (10% Chivacure 1176 in MEK) | 0.11 | 2.2 |
| Total: | 26.11 | 74.35 |

The adhesive formulation was coated to obtain a 75 micron thick film on a polyester film substrate upon drying for 5 minutes at 65° C., followed by 5 minutes at 120° C. to simulate temperature conditions of a coating operation for the adhesive film. The film was thereafter exposed to UV radiation, with a single pass under a FUSION Systems laboratory UV unit equipped with a 300 watt/inch "H" Bulb at a speed setting of 50.

Some samples of the film were immediately cured by exposure to 125° C. for 90 seconds; others were held in a dark room for different lengths of time with and without cure. The samples were then subjected to a double-rub test using MEK to determine the level of curing, the results of which are shown in Table 2.

TABLE 2

| Sample | MEK Test |
| --- | --- |
| Non-activated film | Dissolves in 7 double rubs |
| Immediately after UV exposure | Dissolves in 9 double rubs |
| Immediate thermal cure after UV exposure | Passes 100 double rubs with slight attack |
| 90 minute dark room hold after UV exposure | Dissolves in 15 double rubs |
| 180 minute dark room hold after UV exposure | Dissolves in 23 double rubs |
| 4 day dark room hold after UV exposure | Dissolves in 70 double rubs |
| Thermal cure after 4 day dark room hold after UV exposure | Passes 100 double rubs with slight attack |

These results show the non-activated film adhesive is not cured because it dissolves in only 7 double rubs of MEK. Similarly, films which are UV activated and stored in the dark remain largely uncured given the low number of MEK double rubs required to dissolve the film adhesive. Conversely, films that are thermally cured, either immediately after UV activation or after some dwell period after UV activation, do not dissolve in MEK as exemplified by their resistance to over 100 MEK double rubs with no dissolution.

Example 2

A second film adhesive was formulated with a 50.5% by weight solids content epoxy resin as reflected in Table 3.

TABLE 3

| | Total Weight (g) |
| --- | --- |
| Polyester resin (Bostik KP7962) | 16 |
| Solid curable resin (Epon SU-8) | 15 |
| Liquid epoxy flexibilizer (DER-736) | 1.5 |
| Photoinitiator (Chivacure 1176) | 0.18 |
| Solvent (Methyl Ethyl Ketone) | 67.32 |

Transfer adhesive films were prepared by coating the adhesive onto a silicone coated release liner to obtain approximately 75 micron thick adhesive films after drying 5 minutes at 65° C. followed by 5 minutes at 120° C. The adhesive was heat transfer laminated onto fiberglass reinforced plastic, FR4, using a heated roll laminator set to 95° C.

This material was cut into 1 in. by 3 in. coupons having one square inch of adhesive at one end of the coupon. Each coupon was heat sealed to a non coated coupon of FR4 of the same dimensions to produce a lap shear test sample having a one square inch overlap using DT Industries SENCORP Heat Seal equipment set to 250° F. upper bar temperature, 90 second dwell, and 15 psig pressure.

Lap shear test samples were made with adhesive not exposed to UV energy, while in other samples, the adhesive was activated by UV energy using a FUSION Systems laboratory UV unit equipped with a 300 watt/inch "H" Bulb, 1 pass at a speed of approximately 45 feet per minute resulting in a UVA exposure level of approximately 190 mJ/cm$^2$. Of those samples, some were sealed within 2 minutes after UV exposure, others 1 hour after UV activation and others 2 hours after UV activation.

All samples were then allowed to age in the dark at room temperature for 24 hours prior to testing the bond strength of the samples in dynamic shear mode at 0.05 inches/minute at 65° C. Each test sample was allowed to equilibrate at 65° C. for 5 minutes before starting the test. The results of the test are reflected in FIG. 1 and clearly show that UV exposed samples remain active for bonding for extended times after UV activation, and the samples without UV activation do not produce performance indicative of a cross-linked system.

Example 3

Attenuated Total Reflectance-FTIR spectrum was generated for a 75 micron adhesive film after various aging conditions to determine the percent conversion of the epoxy functionality after exposure to UV energy. The film adhesive for this example was otherwise the same as created in Example 2, except that the polyester and epoxy resin ratio was modified such that the epoxy resin was about 40% by weight of the film adhesive.

The spectrum generated was overlaid and baseline corrected equally for each spectra to enable integration of the area under the curve for the band at 915 cm$^{-1}$ wavenumber representing the glycidyl epoxy functionality. This information was used to calculate the percent conversion of the adhesive at various time intervals after activation with UV energy. The UV activation was carried out using a FUSION Systems laboratory UV unit equipped with a 300 watt/inch "H" Bulb, 1 pass at a speed of approximately 45 feet per minute resulting in a UVA exposure level of approximately 190 mJ/cm$^2$.

Spectra were generated for the following samples: adhesive without UV activation; adhesive UV activated followed by immediate scan; adhesive UV activated then scanned after specific time intervals of the adhesive having been aged in darkness at room temperature (30 minutes, 1 hour, 1 hour 30 minutes, 2 hours, 2 hours 30 minutes, 3 hours, 6 hours, and 24 hours); adhesive UV activated then immediately exposed to 120° C. for 90 seconds to fully thermally cure the system; adhesive UV activated, aged in the dark for 24 hours at room temperature, then exposed to 90 seconds at 120° C. to reflect the adhesive still cures with heat.

Figure 2:
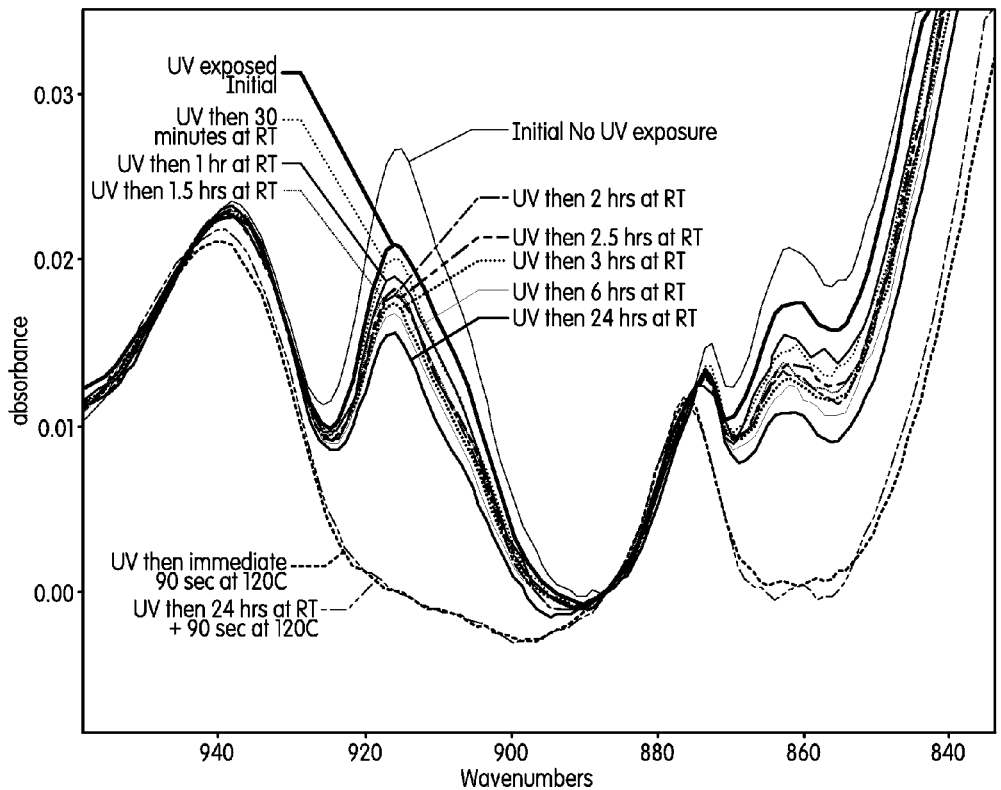
FIGS. 2, 3 and 4 graphically illustrate conversion of epoxy functionality as described with respect to Example 3.
Figure 3:
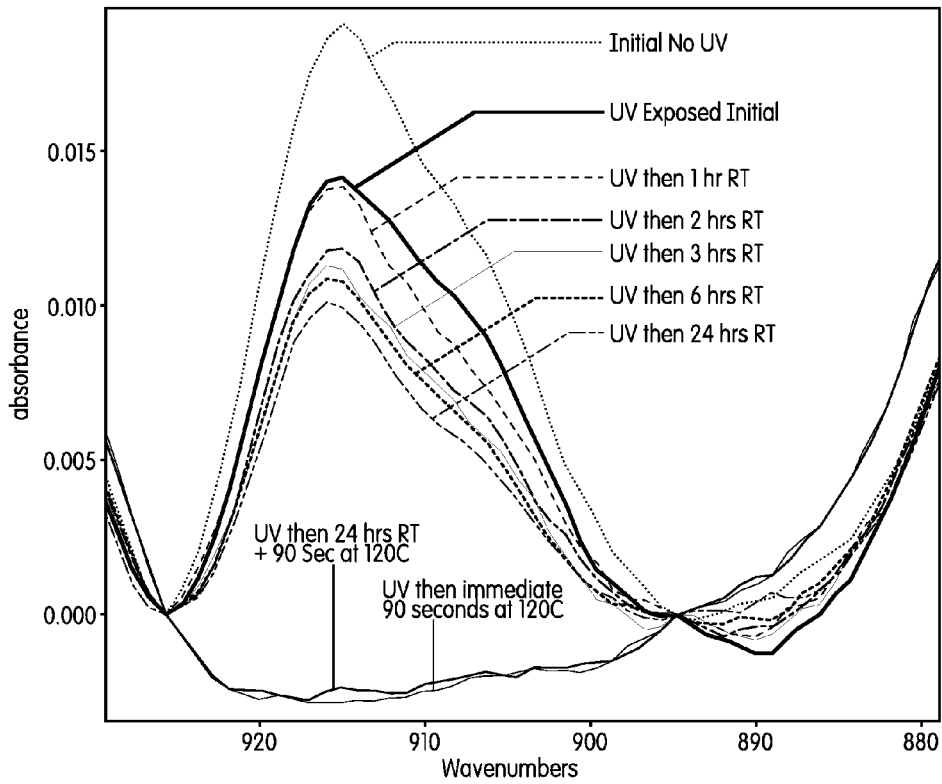
Figure 4:
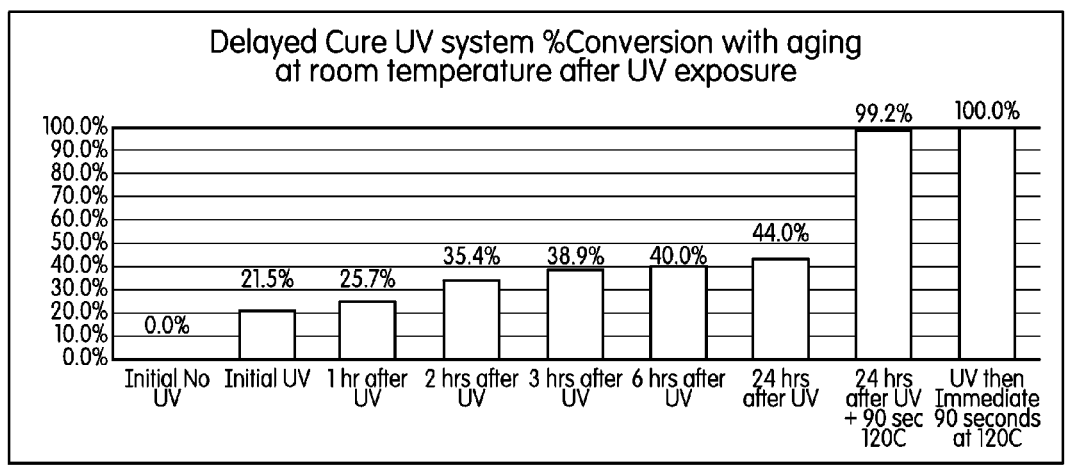

FIGS. 2 through 4 show the delay in conversion of the epoxy functionality at room temperature (approximately 20° C.) after UV activation compared to that obtained when the activated adhesive is exposed to heat that would occur during a heat seal process that would be used to combine substrates. They also show that the film adhesive aged at room temperature for 24 hours after activation will still advance to fully cured with heat input after aging.

Film adhesives according to Example 3 were examined using Differential Scanning calorimetry (DSC) with and without UV exposure to determine the thermal stability prior to UV radiation and further exemplify the speed of thermal cure after UV radiation. The tests were run using a TA DSC Q2000 V24.17 Build 112 instrument from 20° C. to 200° C. with a ramp rate of 20° C. Sample size was maintained as close as possible for sample to sample.

Figure 5:
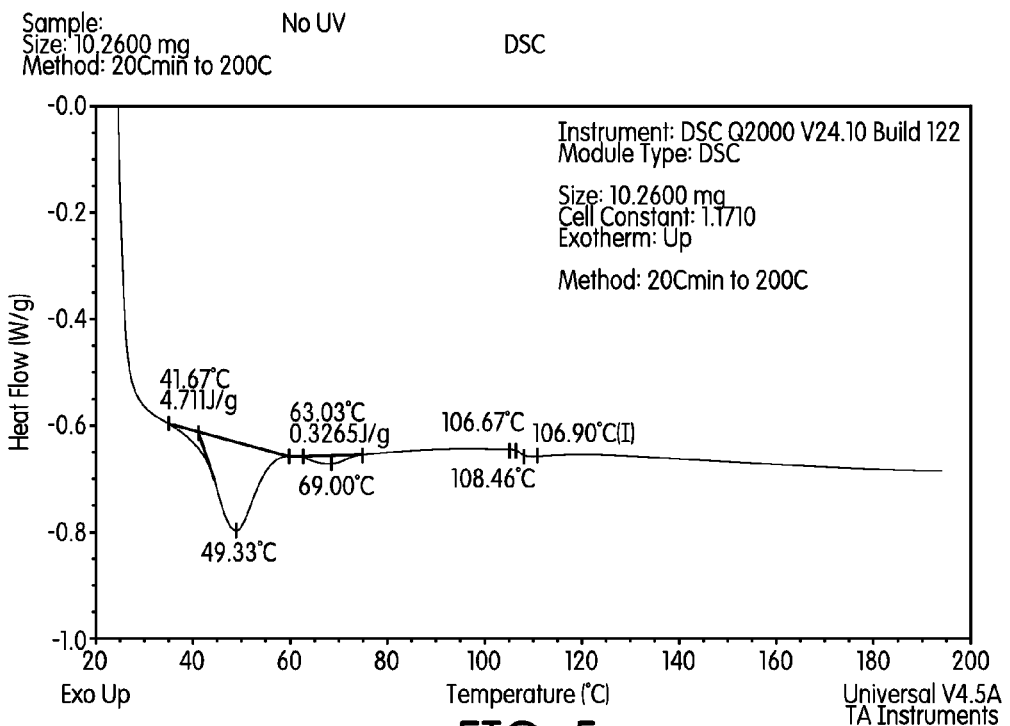
FIGS. 5 and 6 illustrate calorimetry results as described with respect to Example 3.
Figure 6:
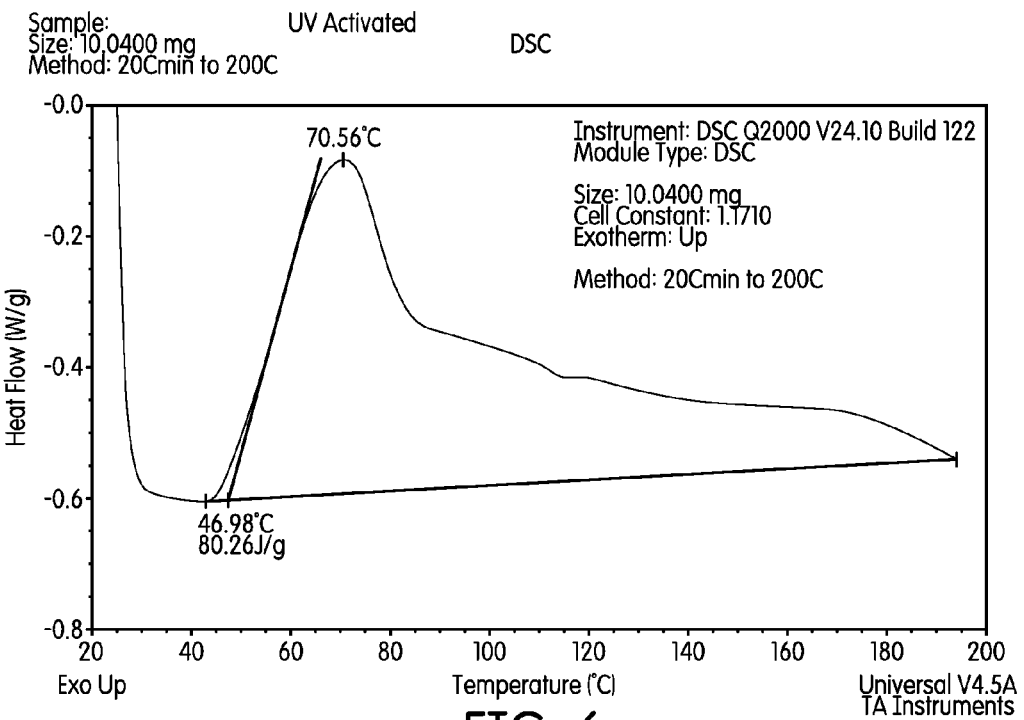

As illustrated in FIGS. 5 and 6, these tests clearly show no thermal crosslinking occurs with non-UV activated film up to 200° C., as there is no evidence of exotherm due to the crosslinking reaction and rapid crosslinking Conversely, the UV activated film when exposed to heat showed a significant exotherm beginning at approximately 50° C., reflecting the ability to process the film adhesive at high temperatures prior to activation, yet capable of achieving a full cure at a low temperature after activation.

Example 4

Another solid film adhesive was formulated starting with a solution of methyl ethyl ketone solvent with a 50.5% by weight total solid content as reflected in Table 4:

TABLE 4

| Component | Mass | Weight % of Solids |
|---|---|---|
| Vitel 3300 polyester resin | 100 g | 49.5 |
| Epon 164 solid epoxy novolak resin | 100 g | 49.5 |
| Speedcure 976 diarylsulfonium hexfluoroantimonate salt (50 wt. % solution of sulfonium salt in propylene carbonate) | 4 g | 1.0 |
| Methyl ethyl ketone | 200 g | N/A |

The Epon 164 and Speedcure 976 were dissolved readily in a pre-made solution of Vitel 3300 in methyl ethyl ketone. This solution was coated on a siliconized PET release liner using a drawdown bar and dried using a drydown profile of 65° C. for 10 minutes to produce a nominally 4 mil thick solid film. Some samples were left untreated for analysis, while others were UV activated using a 300 W/in Fusion H bulb at either 20 fpm (UVA dose of approximately 520 mJ/cm$^2$) or 40 fpm (UVA dose of approximately 260 mJ/cm$^2$).

Lap shear specimens were assembled from both unactivated and UV activated adhesive using abraded stainless steel panels 1 in. by 3 in. in size, with a 1 in. square overlap area. The open time for bonding the UV activated samples was 5 minutes between UV activation and thermal bonding. Samples were bonded/cured at 140° C. for 5 minutes using about 15 psi pressure during bonding. Lap shear testing was performed on an Instron tensile tester at a pull rate of 0.1 inches/minute. Data is summarized in Table 5:

TABLE 5

| Sample Description | Lap Shear Strength (psi) |
|---|---|
| No UV activation + thermal cure | 37.7 |
| UV activation at 40 fpm + thermal cure | 324 |
| UV activation at 20 fpm + thermal cure | 444 |

The data show that the adhesive does not thermally cure without UV activation as evidenced by relatively low lap shear strengths. UV activated samples thermally cure to provide lap shear strengths an order of magnitude higher than those obtained without UV activation. The lower UV conveyor linespeed of 20 fpm produced a more thoroughly cured sample, as evidenced by the highest lap shear values measured. Without wishing to be bound by theory, this is likely due to the additional amount of photoacid catalyst generated with the higher dose (slower linespeed) UV activation step. It will be appreciated that the UV dose required to achieve an optimal thermal activity is formulation dependent.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An actinic radiation activated, thermally curable solid film adhesive consisting essentially of a film forming polymeric binder selected from the group consisting of semicrystalline polyester, styrene-butadiene rubber, an acrylic polymer, and combinations thereof, a cationically curable resin comprising a solid multifunctional epoxy resin, and a cationic photoinitiator comprising a triarylsulfonium salt, wherein the solid film adhesive is processable at temperatures up to 120° C. prior to exposure to actinic radiation without curing, has a latency period at room temperature of at least thirty minutes following activation of the initiator by actinic radiation, and is curable at temperatures above 50° C. following activation of the initiator, wherein the solid film adhesive exhibits latency as a result of limited mobility of reactive groups while in the solid state.

2. The solid film adhesive of claim 1 wherein the film forming polymeric binder is a semicrystalline polyester.

3. The solid film adhesive of claim 1, wherein the cationic photoinitiator is UV activated.

4. The solid film adhesive of claim 1, wherein the cationically curable resin comprises a solid epoxy resin including a glycidyl ether.

5. The solid film adhesive of claim 1, wherein the cationically curable resin is present in the range of about 10% to about 75% by weight of the total solids content of the solid film adhesive and the film forming polymeric binder is present in the range of about 25% to about 90% by weight of the total solids content of the solid film adhesive.

6. The solid film adhesive of claim 5, wherein the cationically curable resin is present in the range of about 35% to about 50% by weight of the total solids content of the solid film adhesive.

7. An actinic radiation activated, thermally curable solid film adhesive consisting essentially of a film forming polymeric binder, a cationically curable resin, and a cationic photoinitiator, wherein the solid film adhesive is processable at temperatures up to 120° C. prior to exposure to actinic radiation without curing, has a latency period at room temperature following activation of the initiator, and is curable at temperatures above 50° C. following activation of the initiator,
  wherein the film forming polymeric binder comprises a polyester semicrystalline resin present in the range of about 25% to about 90% by weight of the solid content of the solid film adhesive,
  wherein the cationically curable resin comprises a solid epoxy resin present in the range of about 35% to about 50% by weight of the solid content of the solid film adhesive, and
  wherein the cationic photoinitiator comprises a triarylsulfonium salt, and wherein the solid film adhesive exhibits latency as a result of limited mobility of reactive groups while in the solid state.

* * * * *